Sept. 22, 1931.　　　J. BRAUNWALDER　　　1,823,875
AIRSHIP
Filed Jan. 30, 1929　　　5 Sheets-Sheet 1

INVENTOR.
John Braunwalder
BY
ATTORNEYS.

Sept. 22, 1931. J. BRAUNWALDER 1,823,875
AIRSHIP
Filed Jan. 30, 1929 5 Sheets-Sheet 2

INVENTOR.
John Braunwalder
BY
ATTORNEYS.

Sept. 22, 1931. J. BRAUNWALDER 1,823,875
AIRSHIP
Filed Jan. 30, 1929 5 Sheets-Sheet 3

INVENTOR.
John Braunwalder
BY
ATTORNEYS.

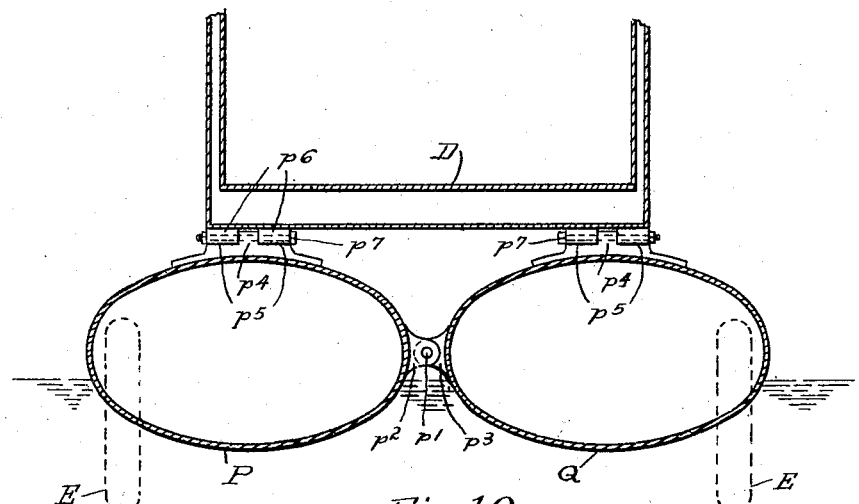
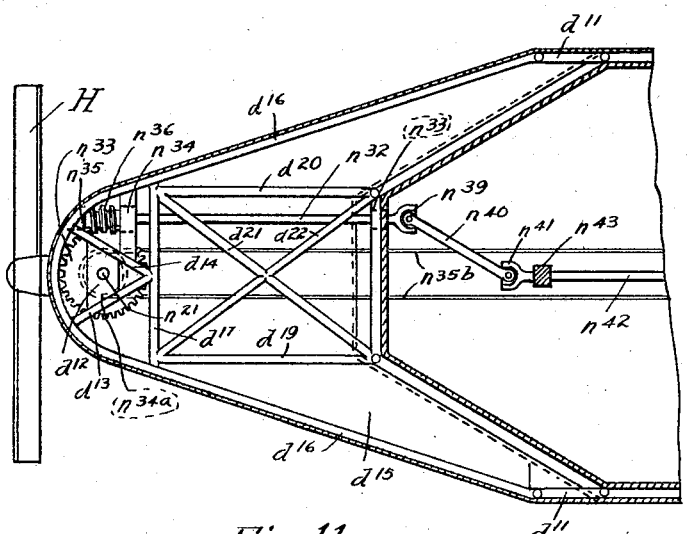
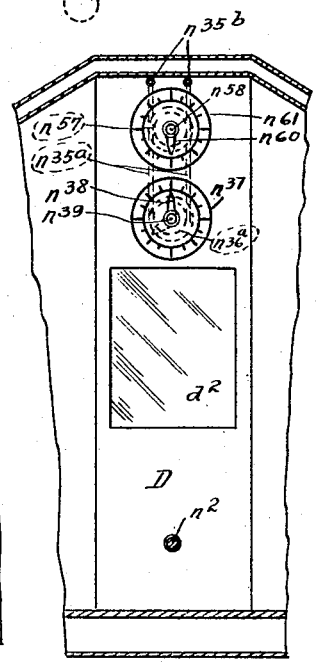

Sept. 22, 1931.  J. BRAUNWALDER  1,823,875
AIRSHIP
Filed Jan. 30, 1929  5 Sheets-Sheet 5

INVENTOR.
BY John Braunwalder

ATTORNEYS.

Patented Sept. 22, 1931

1,823,875

UNITED STATES PATENT OFFICE

JOHN BRAUNWALDER, OF LOS ANGELES, CALIFORNIA

AIRSHIP

Application filed January 30, 1929. Serial No. 336,189.

An object of my invention is to create an airship that will provide a greater measure of safety in its use and operation than has heretofore been accomplished by similar devices.

Another object of my invention is to provide an airship that is able to rise or descend vertically in air.

A further object of my invention is to provide an airship that can remain stationary in air at any desired elevation or turn about in any direction of the compass as desired.

Another object of my invention is to provide an airship with means that will enable same to rise from or descend on land or water, or move about on same at the direction of the operator.

Another object of my invention is to provide means for self-adjustment of the operating devices of the airship to overcome in part the effect of various air currents, to obtain the maximum stability and convenience in travel.

Figure 1:
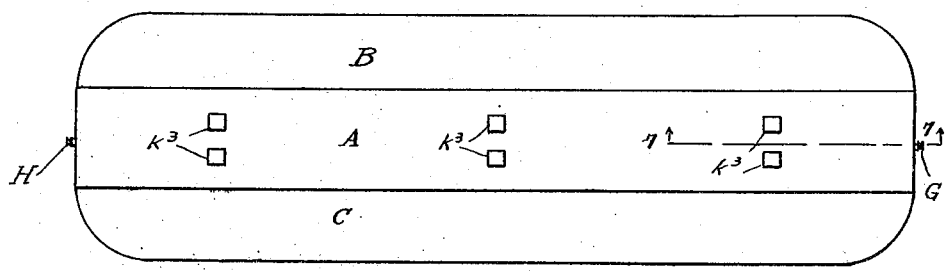
Figure 2:
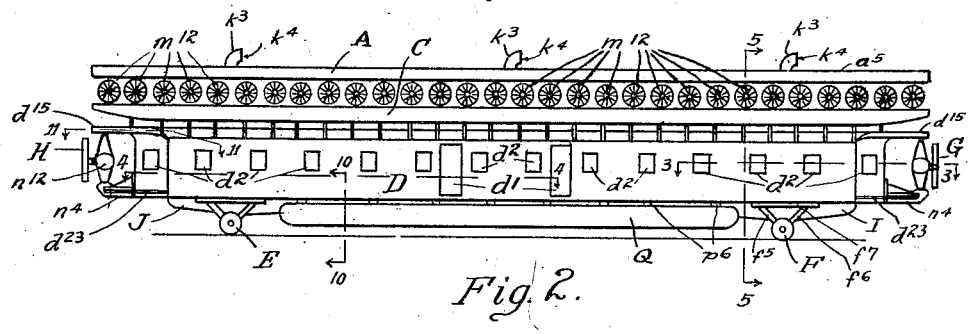

I attain these and other objects by the devices shown in the illustrations in which Fig. 1 of Sheet 1 represents a plan view, and Fig. 2 of Sheet 1 represents a side elevation of the complete device embodying my invention.

Figure 3:
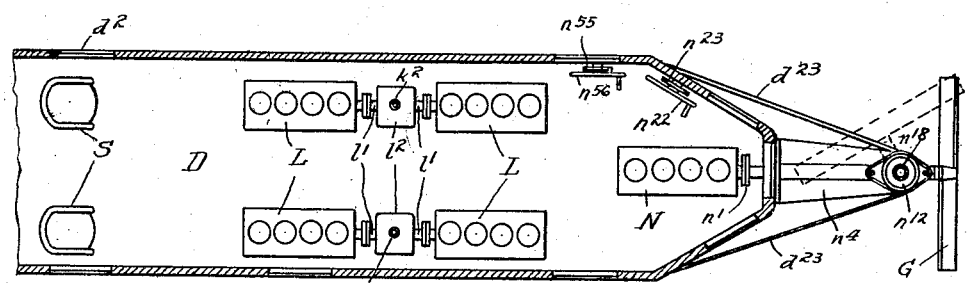

Fig. 3 of Sheet 1 is an enlarged plan section on the line 3—3 on Fig. 2.

Figure 4:
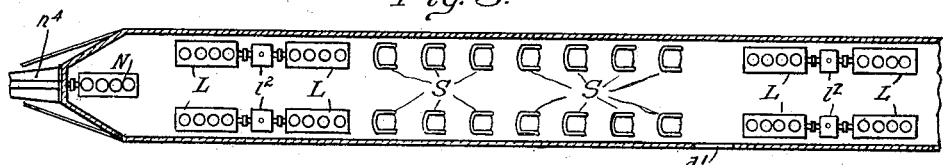

Fig. 4 of Sheet 1 is a plan section on line 4—4 on Fig. 2.

Figure 5:
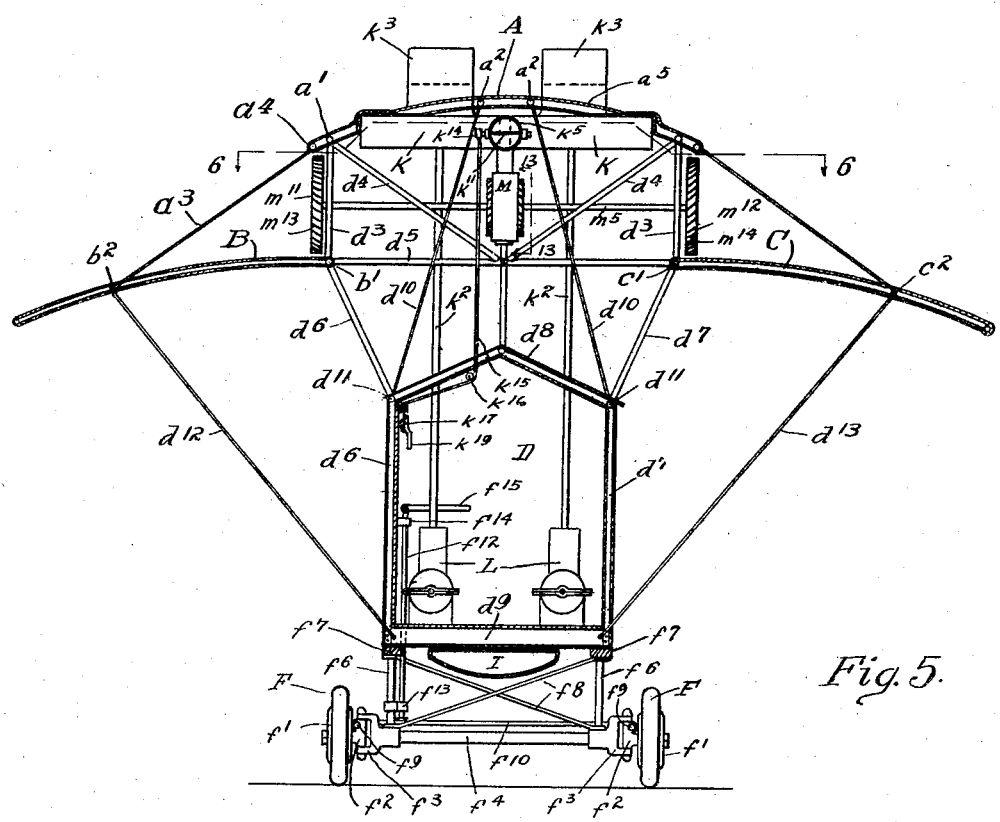

Fig. 5 of Sheet 2 is an enlarged cross section on line 5—5 on Fig. 2, Sheet 1.

Figure 6:
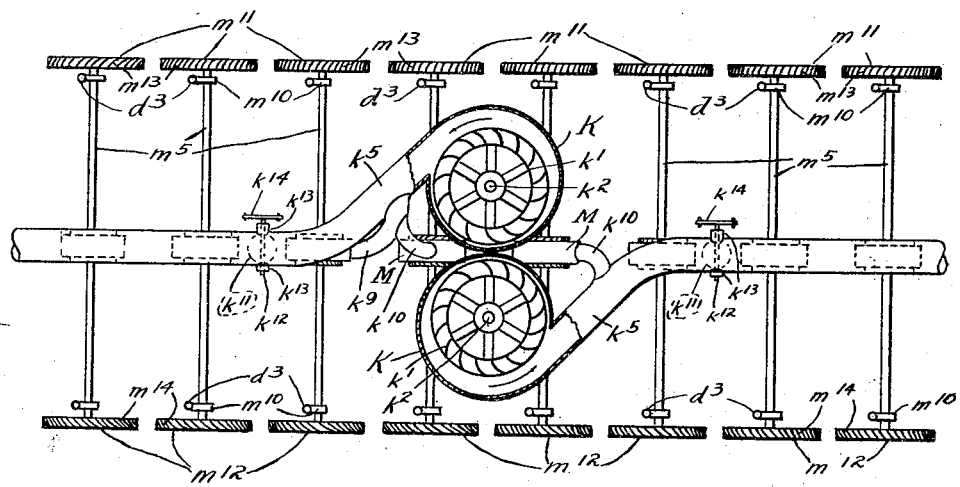

Fig. 6 of Sheet 2 is a plan section on line 6—6 on Fig. 5.

Figure 7:
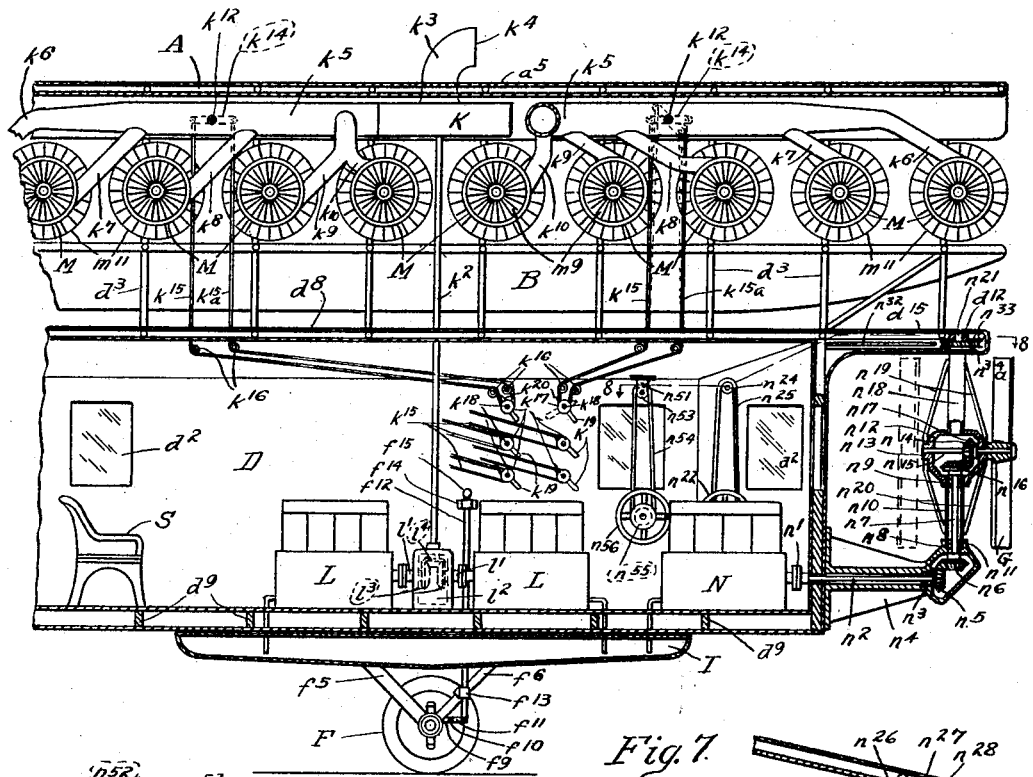

Fig. 7 of Sheet 3 is a longitudinal section on line 7—7 on Fig. 1 of Sheet 1.

Figures 8, 9:
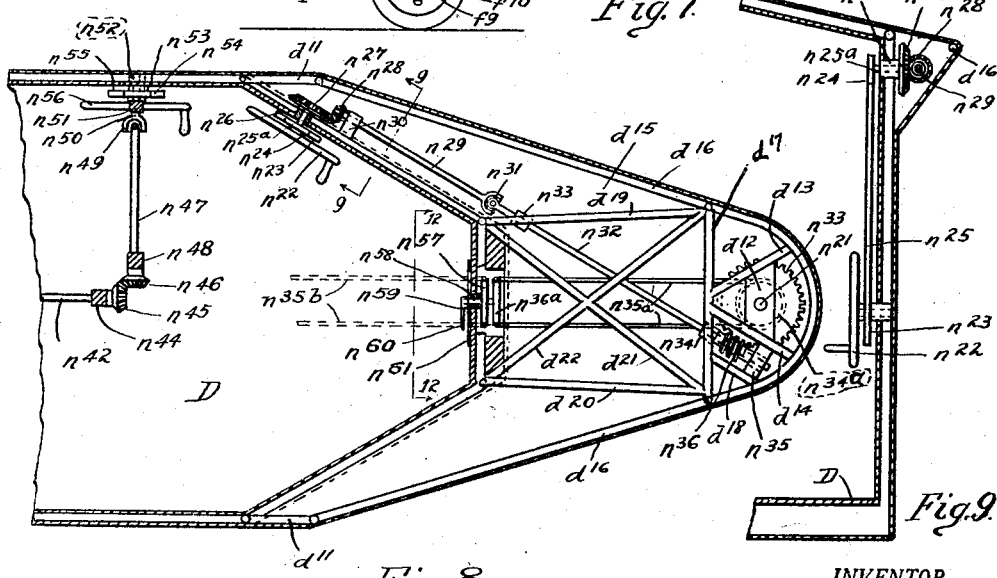

Fig. 8 of Sheet 3 is a plan section on line 8—8 on Fig. 7.

Fig. 9 of Sheet 3 is a section on line 9—9 on Fig. 8.

Fig. 10 of Sheet 4 is an enlarged section on line 10—10 on Fig. 2, Sheet 1.

Fig. 11 of Sheet 4 is an enlarged section on line 11—11 on Fig. 2, Sheet 1.

Fig. 12 of Sheet 4 is a section on line 12—12 on Fig. 8, Sheet 3.

Figure 13:
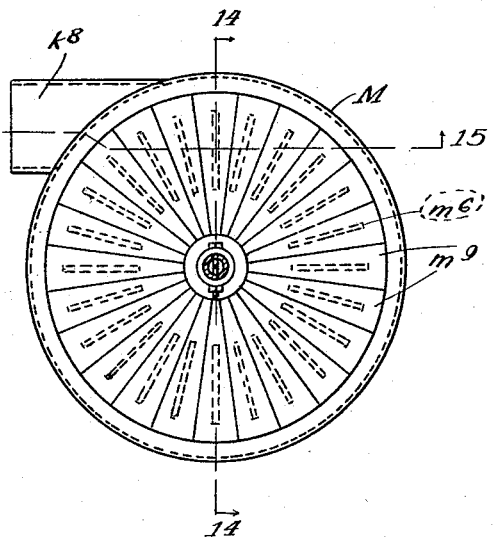

Fig. 13 of Sheet 5 is an enlarged detail section on line 13—13 on Fig. 5, Sheet 2.

Figure 14:
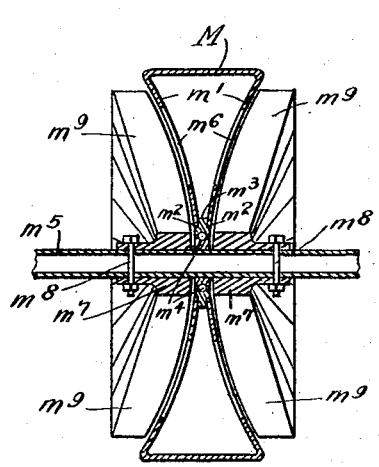
Figure 15:
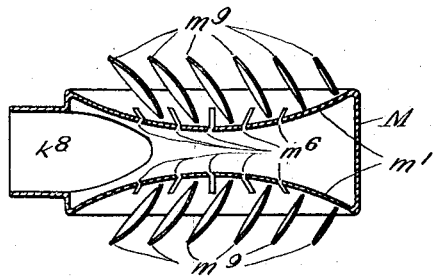

Fig. 14 of Sheet 5 is a section on line 14—14 on Fig. 13 and Fig. 15 shows a section on line 15—15 on Fig. 13.

Referring to Fig 1, of Sheet 1, A represents an approximately horizontally disposed central plane surface, while B and C are similarly disposed auxiliary side planes.

Referring to Fig. 2 a cabin D is suitably provided with landing wheels E and F and removable pontoons P and Q. A horizontally rotatable tractor propeller G is suitably provided at the forward end of cabin D, while a similar propeller H is mounted at the rear end of said cabin D.

Fuel tanks I and J are suitably mounted underneath the cabin D.

Doors $d\,1$ provide means of entrance and exit, and windows $d\,2$ provide means for admitting daylight to the interior of the cabin D.

Referring to Fig. 5, Sheet 2, which shows a cross section of the airship, the central plane A is shown mounted above the side planes B and C respectively, on the standards $d\,3$, and is secured laterally thereto by the diagonal braces $d\,4$, the upper end of which is secured to the intersection of the standards $d\,3$ and the frame bars $a\,1$ of the central plane A, while the lower end thereof secured approximately midway to separator bars $d\,5$ whose ends are secured to the frame bar $b\,1$ and $c\,1$ respectively of the side planes B and C.

Carrier bars $d\,6$ and $d\,7$ extend downwardly from the frame bars $b\,1$ and $c\,1$ respectively to the roof $d\,8$ of the cabin D and extend downward to the floor joists $d\,9$ to which they are suitably secured for lifting and carrying purposes.

Diagonal braces $d\,10$ extend downwardly from the frame bars $a\,2$ of the central plane A, to the longitudinal frame bars $d\,11$ of the cabin D. The side planes B and C are held in a relative position to the central plane A by means of the braces $a\,3$ which extend from the frame bars $a\,4$ of the central plane A to the longitudinal frame bars $b\,2$ and $c\,2$ respectively of the side planes B and C, while the stay bars $d$ 12 and $d$ 13 similarly hold their position with respect to the cabin D, being suitably secured at their upper end to the frame bars $b$ 2 and $c$ 2 respectively and at their lower end to the floor joists $d$ 9. A plurality of pressure fans K, provided with the impeller $k$ 1, which is secured to the impeller shaft $k$2, are suitably secured to the underside of the central plane A as shown in plan view in Fig. 6 of the Sheet 2.

Referring to Fig. 7, Sheet 3, which shows a longitudinal section of the forward and operating end of the cabin D, and the central plane A, the illustration shows a pair of internal combustion engines L suitably connected to a drive shaft L 1 of a gear box L 2, which contains the gears L 3, shown dotted, and the pinion L 4, also shown dotted. The gears L 3 are secured to the inner end of the drive shafts L 1, while the pinion L 4 is attached to the lower end of the impeller shaft $k$ 2, thereby supplying means for driving the shaft $k$2 and the impeller $k$ 1.

An intake pipe $k$ 3, secured to the upper side of the pressure fan K, is preferably formed in the shape of an elbow, with its intake $k$ 4 directed longitudinally towards the forward end of the airship and above the top surface $a$ 5 of the central plane A.

A discharge pipe $k$ 5 is suitably connected to the pressure fan K, and extends longitudinally beneath the central plane A.

A number of branch pipes K 6, K 7, K 8, K 9, and K 10, branch off from said discharge pipe K 5 and connect each individually with the hollow casing M, which comprises the static element of turbine units as shown in enlarged details in Figures 13—14—15 on Sheet 5.

The casing M is provided with concave sides $m$ 1, whose central edges $m$ 2 are suitably attached to the outer ring $m$ 3 of a ball bearing $m$ 4, which is suitably mounted on a hollow drive shaft $m$ 5. A plurality of ports $m$ 6 are cut radially and with suitable angularity in the convex sides $m$ 1. Right and left hand rotors $m$ 7 are secured to the hollow drive shaft $m$ 5 by means of bolts $m$ 8 and are provided with vanes $m$ 9 of suitable angularity and contour.

Referring to Fig. 6, Sheet 2, the drive shaft $m$ 5 extends through bearings $m$ 10 which are suitably secured to the standards $d$ 3, and has attached to its ends the propeller fans $m$ 11 and $m$ 12, whose vanes, $m$ 13 and $m$ 14 respectively, are mounted with opposite angularity.

A butterfly valve $k$ 11 is rotatably mounted in the discharge pipe $k$ 5 on the trunnion shaft $k$ 12 which passes through suitable bearings $k$ 13 and has secured to one end thereof the operating bar $k$ 14.

Referring to Fig. 7, Sheet 3, wires $k$ 15 and $k$ 15 $a$ are shown attached to the ends of the operating bar $k$ 14 and extend down through the roof $d$ 8 of the cabin D and over suitable pulleys $k$ 16 to the control wheel $k$ 17 which is pivotally mounted on a pin $k$ 18 and is provided with a suitable operating handle $k$ 19 and a pointer $k$ 20.

Near the forward end of cabin D is located an internal combustion engine N which is adapted to drive through a suitable coupling $n$ 1, a drive shaft $n$ 2, which is supported near its outer end in a bearing $n$ 3, which is mounted in the bracket $n$ 4, which extends forwardly from the cabin D and to which it is suitably secured.

A bevel gear $n$ 5, secured to the end of the drive shaft $n$ 2 is adapted to mesh with a similar bevel gear $n$ 6, which is secured to the lower end of the shaft $n$ 7, which is adapted to rotate in bearings $n$ 8 and $n$ 9 of the tubular supporting member $n$ 10, which is rotatably mounted in the bearing cup $n$ 11 of the bracket $n$ 4. Secured to the upper end of the supporting member $n$ 10 is a propeller gear casing $n$ 12, which is provided with the bearings $n$ 13 and $n$ 14 in which is rotatably mounted a propeller shaft $n$ 15.

A bevel gear $n$ 16 secured to the upper end of the drive shaft $n$ 7 is adapted to engage with a similar bevel gear $n$ 17 which is mounted on and secured to the propeller shaft $n$ 15.

The tractor propeller G is suitably mounted on, and secured to the propeller shaft $n$ 15.

A tubular pivot shaft $n$ 18 is secured to the upper portion of the gear casing $n$ 12 and is stayed thereto by the braces $n$ 19. Similar braces $n$ 20 extend downwardly from the gear casing $n$ 12 to the lower end of the supporting member $n$ 10, to which they are suitably secured for staying purposes. The upper end of the pivot shaft $n$ 18 is adapted to form a pivot pin $n$ 21 which is rotatably mounted in the bearing $d$ 12, which is suitably secured to the frame members $d$ 13 and $d$ 14 of the forward extension $d$ 15 of the cabin roof $d$ 8 and which is conveniently formed by the curved frame member $d$ 16 which forms a forward extension of the longitudinal cabin frame members $d$ 11.

A cross bar $d$ 17 is suitably attached at its ends to the frame member $d$ 16 and is adapted to support the frame bars $d$ 13, $d$ 14 and $d$ 18, one end of each being secured thereto and the other end to the curved frame member $d$ 16. The cross bar $d$ 17 is suitably braced to the forward end of the cabin D by the members $d$ 19, $d$ 20 and the diagonal braces $d$ 21 and $d$ 22. Suitably mounted on the inside of the cabin D is an operating wheel $n$ 22, which has secured thereto a chainwheel $n$ 23, which is adapted to drive an upper chainwheel $n$ 24 by means of the chainbelt $n$ 25.

The upper chain wheel $n$ 24 is secured to one end of a shaft $n$ 25 $a$ which is rotatably mounted in a bearing n 26, while the other end of said shaft n 25 a has attached thereto a bevel gear n 27 which is adapted to mesh with the bevel pinion n 28, which is secured to the end of a shaft n 29, which is rotatably mounted in bearing n 30.

The other end of shaft n 29 has secured thereto the universal joint n 31, which connects to a worm shaft n 32, which is rotatably mounted in bearings n 33, n 34 and n 35.

A worm n 36 is suitably mounted on shaft n 32 and is adapted to mesh with a worm wheel n 33, which is secured to the upper end of the pivot shaft n 18, thereby forming means to rotate said pivot shaft n 18 with the attached propeller gear casing n 12 and propeller G in a horizontal direction.

A sheave wheel n 34 a is mounted immediately below the worm wheel n 33 on the pivot shaft n 18 and is adapted to operate the indicator belt n 35 a, which is suitably mounted over said sheave wheel n 34 a and an indicator sheave wheel n 36 a.

On the inside of the cabin D is located in a suitable position the indicator dial n 37 which is provided with suitable markings or graduations.

An indicator n 38 is attached to the end of a shaft n 39 which is rotatably mounted in the central portion of the dial n 37 and has attached to the farther end thereof the indicator sheave wheel n 36 by which the indicator n 38 is operated to indicate the relative position of the tractor propeller G with respect to the longitudinal axis of the cabin D.

In Fig. 3, Sheet 1, the dotted position of the propeller G corresponds with the dotted position of the indicator n 38, as shown in Fig. 12, Sheet 4.

Braces d 23 are suitably connected to the cabin D and to the extended end of bracket n 4 to hold same in relative alignment with the cabin D.

As the propeller H at the rear end of the cabin D is provided with identical detail parts and mechanism as the mechanism and mounting of the forward propeller G, a duplicate description of same is omitted but such parts as are shown and are identical will be enumerated similarly and are considered alike.

A slight difference in the directional operating mechanism is required to bring the operating devices to the forward end of the cabin D and is accomplished by placing the worm shaft n 32 parallel with the axis of the cabin D and extending its functions to the forward end thereof by connecting an angularity shaft n 40 to the universal joint n 39, which is attached to said worm shaft n 32 and to a universal joint n 41, which is attached to the longitudinal shaft n 42, which is suitably mounted in bearings n 43 and n 44.

The forward end of the shaft n 42 has secured thereto a bevel gear n 45 which is adapted to engage with the bevel gear n 46, which is secured to the shaft n 47, which is rotatably mounted in bearing n 48, and has secured thereto, at the other end thereof, a universal joint n 49, which forms an extension of the shaft n 50, which is rotatably mounted in the bearings n 51 and n 52. An upper chain wheel n 53 is suitably mounted on and secured to the shaft n 50 and is adapted to be operated by the chain belt n 54, which connects said chain wheel n 53 operatively to the chain wheel n 55, which is secured to a rotatably mounted operating wheel n 56.

The indicator belt n 35 b of the rear propeller equipment extends to the forward end of cabin D and is suitably mounted over the sheave wheel n 57, which is attached to the end of an indicator shaft n 58, which is rotatably mounted in the bearing n 59 and has attached to the other end thereof the indicator n 60, which is centrally mounted within the dial n 61. Means are thus provided to indicate to the operator the relative position of the rear propeller H.

In Fig. 10, Sheet 4, is shown a preferred method of mounting the removable pontoons P and Q, which are shown connected to each other by the bolt p 1, which passes through lugs p 2 and p 3 of the pontoons P and Q respectively. Lugs p 4 are secured to the upper surfaces of the pontoons P and Q and are provided with seats p 5, which form a support for the lugs p 6, which are suitably secured to the underside of the cabin D.

Bolt p 7 extends through the lugs p 4 and p 6 and thus forms means for securing the pontoons P and Q to the cabin D.

Seats S or other suitable equipment may be installed in the available spaces in the cabin D.

To make travel on roadways possible the cabin D is provided near the forward end on the underside thereof with a pair of tires F and at the rear end and underside thereof with the tires E. These tires are mounted on wheels f 1, which are adapted to rotate on the steering yokes f 2, which latter are rotatably mounted in the steering forks f 3 of the axle f 4.

Suitable frames f 5 and f 6 are supported on said axle f 4 while the upper end thereof is attached to a stringer f 7, which is secured to the underside of the cabin D. Suitable brace rods f 8 are adapted to resist lateral displacement of the axle in relation to the cabin D. Steering arms f 9 connect with the transverse rod f 10, which in turn is connected to a lever f 11 secured to the steering post f 12. The steering post f 12 is suitably mounted in bearings f 13 and f 14 and is provided at the upper end thereof with a suitable steering handle f 15.

To place this airship in operation, the butterfly valves *k* 11 are first closed by moving the control handles *k* 19 to the left as indicated in the dotted position thereof as shown in Fig. 7, Sheet 3.

The engines L are then brought into full running operation, which will cause a static air pressure to accumulate in the fan K and its discharge pipe *k* 5.

As shown in the illustration, a suitable number of rotors are connected with the discharge pipe *k* 5 between the butterfly valve *k* 11 and the fan and these are set in motion by the developed air pressure which causes the compressed air to flow through the ports *m* 6 which thereafter impinges on the vanes *m* 9 of the rotors *m* 7 which in turn rotate the shaft *m* 5 and the propellers *m* 11 and *m* 12.

These propellers will draw air from above the plane surfaces B and C creating a reduced air pressure thereon and by forcing said air underneath the planes A, B and C will create an increased air pressure underneath same, thereby causing a lifting pressure on said planes.

As the butterfly valves *k* 11 are opened, an increased number of rotors are set in motion and as the lifting force is thereby increased to the point where it exceeds, the forces of gravity exerted on the airship, same will rise upwardly.

The forward and rear tractor propeller are next brought into operation by the starting of the engines N. Suitable directional position is then given these tractor propellers by rotating the operating wheels *n* 22 and *n* 56.

When sufficient elevation is attained, the butterfly valves *k* 11 are partially closed or the air pressure developed by the fans K may be reduced by the partial slowing up of the speed of the engines L.

Forward or rear incidence of the airship may be obtained by suitable manipulation of the control handles *k* 19 and thereby utilizing attained forward speed in altering or maintaining the desired elevation of the airship.

In lowering the airship to the earth's surface, forward speed is first reduced to a desired degree by slowing the engines N and reversing the position of the rear propeller H and if required by wind conditions also the forward propeller G, then closing the butterfly valves *k* 11 as stated, which will cause a very gradual lowering in elevation of the airship due to the parachute effect of the comparatively large plane surfaces. In descending, the air underneath the plane surfaces is forced towards the central axis of the airship by the curvature of the side planes B and C and is there greatly resisted from an upward flow by the opposing forces of the rotating propellers *m* 11 and *m* 12 and the exhaust of the rotors which drive same.

When landing on the ground, the front and rear wheels may be suitably steered for desired traveling, using the engines N and the tractor propellers H and G for the required power.

When landing on water, the steering may be accomplished by suitable manipulation of the operating wheels *n* 56 and *n* 22.

Having thus described my invention and its mode of operation, I prefer not to be limited to the exact form of devices shown, but what I claim broadly as my invention and desire to secure by Letters Patent, is:

1. In an airship, a central plane surface longitudinally disposed, a plurality of side planes extending parallel to, and outwardly and below said central plane surface, means for creating opposing air currents from above said side planes to the under side of said central plane surface, to create an increased static air pressure thereunder.

2. In an airship, a central plane surface longitudinally disposed, a plurality of side planes extending parallel to and outwardly and below said central plane surface, a plurality of fans adapted to create opposing air currents from above said side planes, towards and under said central plane surface, and means for controllable operation of said fans.

3. In an airship having a central plane and a plurality of side planes longitudinally disposed, a primary means for creating a lifting power on said planes comprising a plurality of fans adapted to draw air from above said central plane and discharging said air through regenerative power devices at the underside of said central plane, said regenerative power devices adapted to operate fans comprising a secondary means for creating lifting power.

4. In an airship having a central plane and a plurality of side planes longitudinally disposed, a primary means for creating a lifting power on said planes comprising a plurality of pressure fans adapted to draw air from above said central plane, regenerative power devices adapted to be operated by the air discharged from said pressure fans, a plurality of fans adapted to be driven by said regenerative power devices and adapted to draw air from above said side planes and to discharge said air from opposite sides underneath said central plane, and means for controlling the operation of said regenerative power devices.

5. In an airship having a central plane longitudinally disposed, and a plurality of side planes extending parallel to, and below said central plane, means for creating a flow of air around said side planes at right angle to the central longitudinal axis of said airship, inwardly from above said side planes and outwardly below said side planes, to create a lifting pressure thereon, means for controlling said flow of air and means for directional propulsion.

6. In an airship, a central plane longitudinally disposed, side planes extending parallel to and below said central plane, said side planes provided with a downward curve towards the outer edge thereof, means for creating a circulatory flow of air around said side planes at right angles to the central longitudinal axis of said airship, inwardly above and outwardly below said side planes, means for controlling said flow of air and means for supporting said side planes against the forces created by said flow of air.

7. In an airship, a central plane surface longitudinally disposed, a plurality of side planes extending parallel to and outwardly and below said central plane, means for creating a circulatory flow of air around said side planes, at right angles to the longitudinal axis of said airship, inwardly above and outwardly below said side planes, segregated means for controlling said flow of air on portions of said side planes, and means for directional propulsion.

8. In an airship, a central plane, a plurality of side planes, a plurality of fans adapted to create a reduced air pressure above said central plane, a series of rotors adapted to be operated by the air pressure created by said fans, a series of fans adapted to be operated by said rotors and adapted to create a reduced air pressure above said planes and an increased air pressure below said planes, for the purpose of creating a lifting force on said planes.

9. In an airship, the combination of a central plane surface, a plurality of side planes, means for creating a circulatory flow of air around said side planes at right angles to the longitudinal axis of said airship, segregated means for controlling said flow of air on portions of said side planes, a cabin adapted for carrying passengers and merchandize, means for directional propulsion and means for rolling and steering said airship when on the ground.

10. In an airship, a central plane surface longitudinally disposed with respect to the central axis of the airship, said plane surface formed convex upwardly over the central portion thereof, said central plane mounted by suitable framing above and to a cabin forming the body of said airship, a pair of side planes extending parallel to and below said central plane surface and securely mounted to said framing at the inner edge of said side planes, the outer portion of said side planes provided with a downward curvature and suitably braced to said cabin and to said central plane, means for creating a circulatory flow of air around said side planes comprising pairs of fans mounted rotatably between the outer edges of the central plane surface and the inner edges of the side planes, said fans adapted to be driven simultaneously on a common shaft and arranged to drive a current of air towards each other for the purpose of creating an increased static air pressure underneath said central plane.

11. In an airship, a central plane longitudinally disposed, a plurality of side planes extending parallel to said central plane, a cabin suitably attached to said planes, a plurality of pressure fans adapted to draw air from above said central plane, a discharge pipe leading from each of said pressure fans to a series of rotors, said rotors adapted to operate fans adapted to draw air from above said side planes, means for controlling the operation thereof, means for driving said pressure fans, and means for directional propulsion.

12. In an airship having a central plane surface longitudinally disposed, a plurality of side planes extending parallel thereto and outwardly and below said central plane, means for creating a circulatory flow of air around said side planes at right angle to the longitudinal axis of the airship, a cabin longitudinally disposed under said central plane, an elongated roof on said cabin projecting beyond either end of said cabin and adapted to form the upper support for a rotatable pivot shaft of a directional tractor propeller, a bearing secured to the end of said cabin forming the lower support for said pivot shaft, means for operating said tractor propeller, means for rotating said pivot shaft and means for indicating the rotation thereof within the cabin.

13. In an airship having a central plane surface longitudinally disposed, a plurality of side planes extending parallel to and outwardly and below said central plane surface and suitable framing to support said planes above a cabin, the combination of means for creating a circulatory flow of air around said side planes at right angles to the longitudinal axis of said airship, inwardly above and outwardly below said side planes, means for segregated control of the flow of air around portions of said side planes, means for directional propulsion, means for rolling and steering said ship on land and means for floating said ship on water.

14. In an airship, suitable plane surfaces adapted to support said airship above the earth's surface, means for creating a lifting force on said plane surfaces comprising a power-generating unit adapted to operate the impeller of a pressure fan, an intake to said fan extending above said plane surfaces, a discharge pipe adapted to transmit a supply of air under pressure from said fan to a series of rotors, each of said rotors adapted to drive a pair of propeller fans, said propeller fans adapted to draw air from the upper side of said plane surfaces and adapted to discharge same to the lower side thereof, a butterfly valve suitably secured to the discharge pipe of said pressure fan, and means for operating said butterfly valve.

In testimony whereof, I hereunto affix my signature.

JOHN BRAUNWALDER.